No. 811,899. PATENTED FEB. 6, 1906.
A. BILLSTEIN.
COLLAPSIBLE REEL.
APPLICATION FILED JULY 14, 1905.

2 SHEETS—SHEET 1.

Witnesses

Inventor
Aaron Billstein

Attorneys

No. 811,899. PATENTED FEB. 6, 1906.
A. BILLSTEIN.
COLLAPSIBLE REEL.
APPLICATION FILED JULY 14, 1905.
2 SHEETS—SHEET 2.
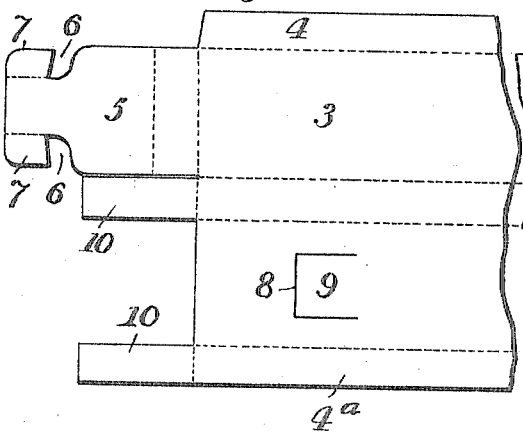
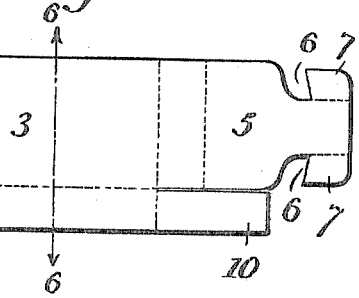
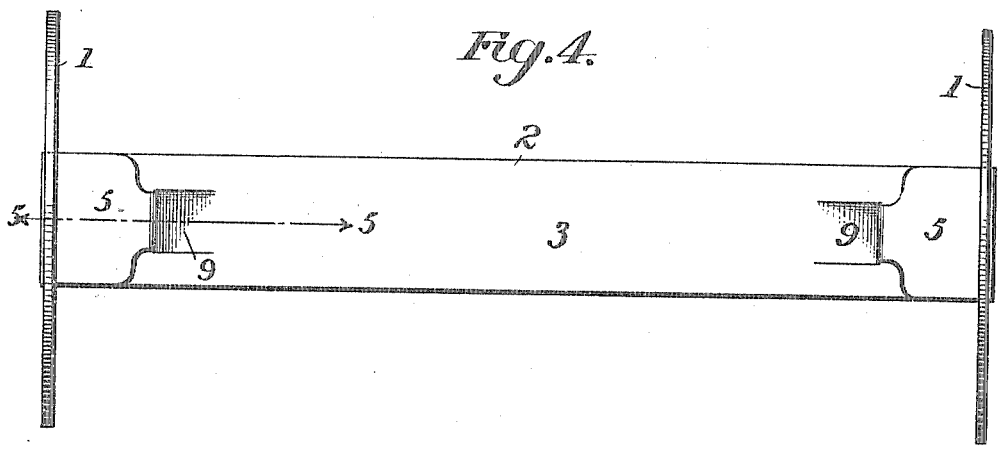
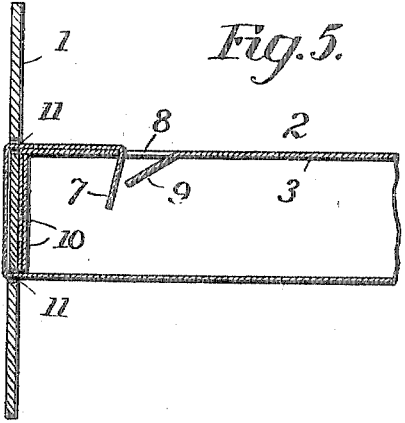
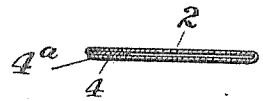
Witnesses
Inventor
Aaron Billstein
Attorneys

UNITED STATES PATENT OFFICE.

AARON BILLSTEIN, OF BALTIMORE, MARYLAND, ASSIGNOR TO THE FRIEDENWALD COMPANY OF BALTIMORE CITY, OF BALTIMORE, MARYLAND, A CORPORATION OF MARYLAND.

COLLAPSIBLE REEL.

No. 811,899.  Specification of Letters Patent.  Patented Feb. 6, 1906.

Application filed July 14, 1905. Serial No. 269,696.

*To all whom it may concern:*

Be it known that I, AARON BILLSTEIN, a citizen of the United States, residing at Baltimore, in the State of Maryland, have invented certain new and useful Improvements in Collapsible Reels, of which the following is a specification.

The object of the present invention is to produce a reel which is suitable for receiving cord, tape, braid, and like articles, which is inexpensive, and which may be collapsed when not in use and is thus especially adapted for shipping and storage.

The invention will be described in detail in connection with the accompanying drawings, in which—

Figure 1:
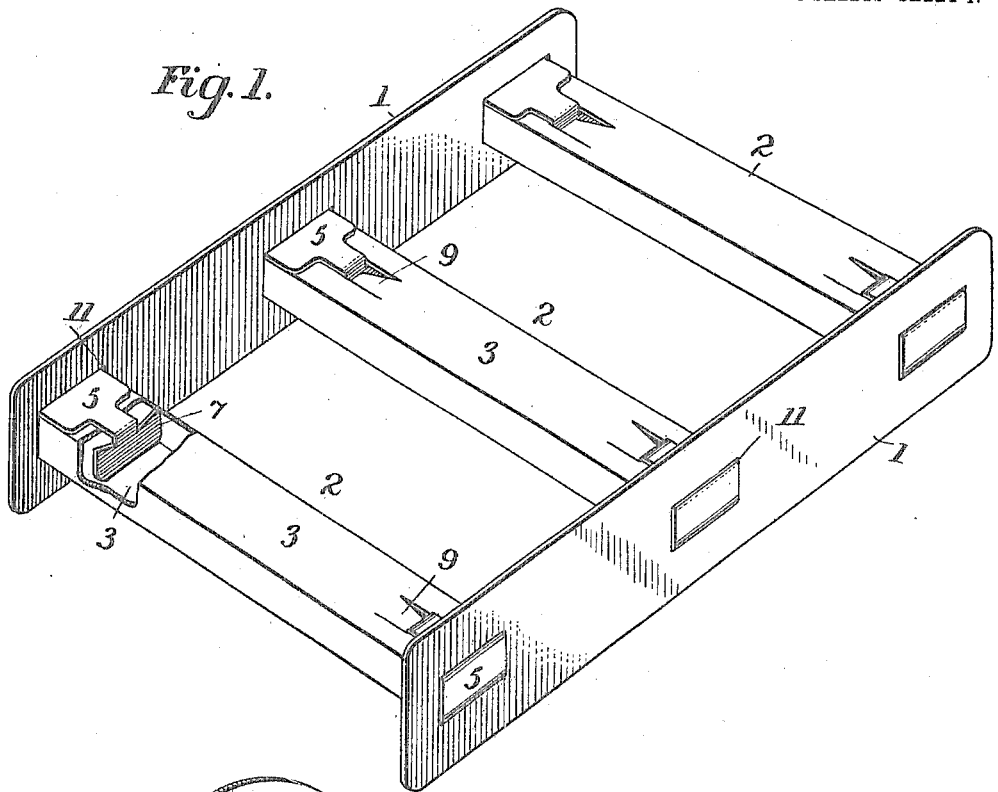
Figure 2:
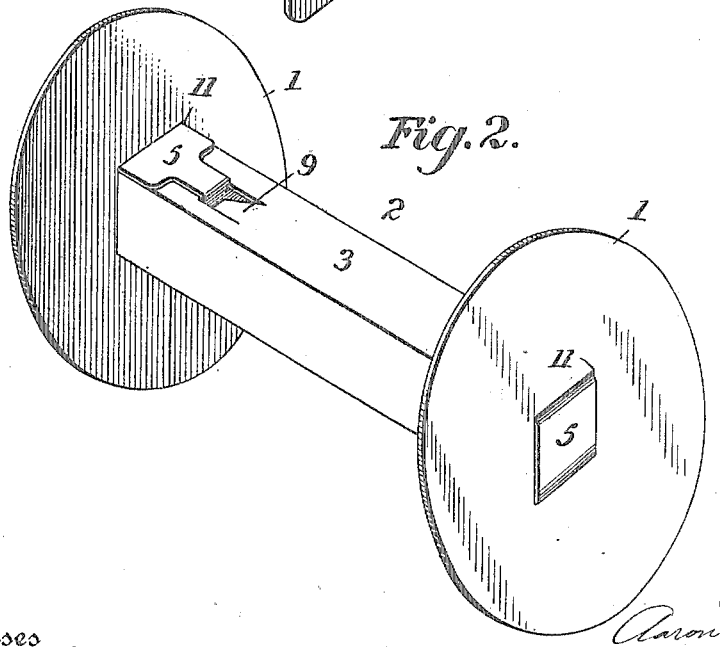

Figure 1 is a perspective view of a reel embodying the invention and having a plurality of transverse members. Fig. 2 is a similar view of a reel or spool having a single transverse member. Fig. 3 is a half plan view of the blank for forming one of the transverse members. Fig. 3ª is a half plan view of the same folded and collapsed in the form in which it is shipped or stored. Fig. 4 is a plan view of the reel or spool shown in Fig. 2. Fig. 5 is a section on the line 5 5 of Fig. 4; and Fig. 6 is a section on the line 6 6 of Fig. 3ª, showing one of the transverse members collapsed.

Referring to Fig. 1 of the drawings, 1 indicates the side or flange members of a reel, and 2 the transverse members. There may be as many of the transverse members as desired, depending upon the size and proportions of the reel desired. Each of the transverse members comprises, preferably, a collapsible tube having means for interlocking its ends with the flange members. These transverse members are preferably constructed from blanks, such as are illustrated in Fig. 3, which are adapted to fold up into stiff rectangular tubes. The blank, as shown, comprises the body portion 3, having a side flap 4, which is gummed to the opposite side flap 4ª to form the tube. The blank is suitably scored to fold into the rectangular form shown, for instance, in Fig. 1. Connected to the ends of one side, which may be termed the "bottom," are the end flaps 5, having notches 6 and ears 7. In the opposite side of the tube, which may be termed the "top," are wide slits 8 in the form of three sides of a rectangle. The tongues 9 are preferably left intact with the box. The opening formed by the slit 8 is preferably wide enough to permit of the insertion of the finger of the operator who assembles the reel. Two flaps 10, in line with and of equal width to the edges of the box, are preferably provided at each end thereof. These flaps are folded in, as indicated in Fig. 5, and tend to stiffen the box and preserve its rectangular shape.

Each flange member is provided with two slots 11 at each end of each of the transverse members, which slots are sufficiently long to receive the tongues 5 and wide enough to permit the tongues to be readily passed through them. The transverse members are made and stored until ready for use in a knockdown or collapsed condition, the margins 4ª being secured together by paste or other suitable means, as illustrated in Fig. 6. When it is desired to assemble a reel, the transverse member is made to assume a rectangular cross-section by pressing the edges together, and the end folds 10 are then turned in to close and stiffen the ends of the tube. Each tongue 5 is then passed successively through the two slots in one of the side members, and the extremity of the tongue is then pushed through the rectangular opening formed by the slit 8. The ears 7 are easily passed through said rectangular opening, and they separate, as illustrated in Fig. 1, and securely lock the flap to the flange member. In this way the tubular member is readily and securely locked to the side members, and likewise the side members tend to preserve the rectangular form of the tubular member and prevent its collapsing.

Two or more tubular members may be used in one reel, and reels of large size may thus be formed. Small reels or spools may have a single tubular member, as shown in Fig. 2. Before assembling the reel shown in Fig. 1, for instance, the members of the said reel consist of three tubes collapsed, as shown in Fig. 6, and two flat side pieces, all of which may be packed in very small compass for the purpose of shipping or storage. The reels may be very quickly assembled, and when assembled they are rigid and substantial, owing to the tubular form of the transverse members and the strong interlocking connections between the said members and the flanges.

It will be evident that the broad features of my invention may be embodied in various forms, and it is therefore to be understood that I do not limit myself to the precise details illustrated and described.

What I claim, and desire to secure by Letters Patent, is—

1. A collapsible reel comprising two side plates or flanges and a plurality of transverse collapsible tubular members connected at their ends to said plates or flanges.

2. A collapsible reel comprising two side plates or flanges and a plurality of transverse collapsible tubular members, said flanges and tubular members being constructed to interlock.

3. A collapsible reel comprising a pair of flange members each having two slots therein and a tubular connecting member having at each end a flap passing through said slots, said flap having its end connected to said tubular member.

4. A collapsible reel comprising two flange-sections, each section being provided with two slots, in combination with a tubular transverse member having at each end a flap adapted to pass out through one slot in a flange member and in through the other slot therein, and said flap having at its free end ears which engage an opening in the body of the tubular member.

5. A collapsible reel comprising two flange members provided with pairs of parallel slots and a transverse member consisting of a collapsible tube provided at its ends with tongues for interlocking with the slots in the flange members and with means for locking the said tongues in engagement with the flange members.

6. In a collapsible reel comprising a pair of flange members and a plurality of tubular collapsible transverse members, said tubular members having flaps adapted to interlock with the flange members.

7. A collapsible reel comprising flange members and transverse tubular members having openings therein adapted to receive the finger of an operator, flaps on the ends of said tubular members adapted to interlock with the flange members, and adapted to be pushed through the openings by the finger of the operator and having ears to interlock with the said tubular member.

8. In a collapsible reel, a collapsible tubular member having the end flaps 5 and 10 at each end whereby the ends may be closed and rendered secure and having the slits 8 forming enlarged openings near the ends adapted to receive the ends of the flaps 5, said flaps having the ears 7 adapted to interlock with the slits 8 for the purpose set forth.

9. A reel comprising two side plates or flanges, each having a plurality of pairs of slots therein, and a plurality of tubular transverse members each adapted to be securely interlocked at its ends with the flange members, said tubular members being collapsible, for the purpose set forth.

In testimony whereof I have signed my name to this specification in the presence of two subscribing witnesses.

AARON BILLSTEIN.

Witnesses:
J. J. WHITE,
R. M. STEER.